United States Patent
Chou et al.

(10) Patent No.: US 7,639,465 B2
(45) Date of Patent: Dec. 29, 2009

(54) INRUSH CURRENT RESTRAINING CIRCUIT AND AUDIO DEVICE USING THE SAME

(75) Inventors: Shih-Kai Chou, Taipei Hsien (TW); Jui-Chin Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 325 days.

(21) Appl. No.: 11/616,898

(22) Filed: Dec. 28, 2006

(65) Prior Publication Data

US 2008/0107285 A1    May 8, 2008

(30) Foreign Application Priority Data

Nov. 3, 2006   (TW) .................... 95140833

(51) Int. Cl.
*H02H 9/00*   (2006.01)
(52) U.S. Cl. .................... 361/58; 361/56; 361/93.1; 361/111; 323/908
(58) Field of Classification Search .................... 361/56, 361/58, 93.1, 111; 323/908; 381/94.5
See application file for complete search history.

(56) References Cited

U.S. PATENT DOCUMENTS

| | | | | |
|---|---|---|---|---|
| 3,935,527 | A * | 1/1976 | Michelet et al. .................... 363/49 |
| 4,148,088 | A * | 4/1979 | Meroni .................... 361/93.4 |
| 4,153,924 | A * | 5/1979 | Moran .................... 361/94 |
| 4,672,303 | A * | 6/1987 | Newton .................... 323/285 |
| 5,283,707 | A * | 2/1994 | Conners et al. .................... 361/58 |
| 5,404,094 | A * | 4/1995 | Green et al. .................... 323/282 |
| 5,793,589 | A * | 8/1998 | Friedl .................... 361/58 |
| 6,184,667 | B1 * | 2/2001 | Lacey .................... 323/282 |
| 6,744,612 | B2 * | 6/2004 | Chen .................... 361/58 |
| 2007/0109171 | A1 * | 5/2007 | Mallinson et al. .................... 341/155 |

FOREIGN PATENT DOCUMENTS

| JP | 62076815 A | 4/1987 |
|---|---|---|
| JP | 8213849 A | 8/1996 |
| TW | M250459 | 11/2004 |

* cited by examiner

*Primary Examiner*—Fritz M Fleming
*Assistant Examiner*—Terrence R Willoughby
(74) *Attorney, Agent, or Firm*—Wei Te Chung

(57) ABSTRACT

An inrush current restraining circuit (100) includes a power source (Vcc), a charging/discharging circuit (11), a switching circuit (13), a first impedance component (Z1), a second impedance component (Z2), and a controller (10). The charging/discharging circuit is connected to the power source. An input of the switching circuit is connected to the charging/discharging circuit, and an output of the switching circuit is defined as an output of the inrush current restraining circuit. One end of the first impedance component is connected to the power source. The second impedance component is connected between the other end of the first impedance and the switching circuit. The controller is connected a joint of the first impedance component and the second impedance component, for providing a control signal.

17 Claims, 3 Drawing Sheets

INRUSH CURRENT RESTRAINING CIRCUIT AND AUDIO DEVICE USING THE SAME

BACKGROUND OF THE INVENTION

1. Field of the Invention

The present invention relates to inrush current restraining circuits, and particularly to an inrush current restraining circuit and an audio device using the same.

2. Description of Related Art

Generally, with the development of technologies, audio devices, such as set-top boxes are widely used. Each of the audio devices has a DC-blocking capacitor used in an output thereof. When the audio device is initially powered on, an inrush current is generated due to a capacitance effect. When the inrush current flows to an earphone or loudspeaker, a loud popping noise is generated, which can be painful, or at least annoying, to users.

SUMMARY OF THE INVENTION

A exemplary embodiment of the present invention provides an inrush current restraining circuit, which includes a power source, a charging/discharging circuit, a switching circuit, a first impedance component, a second impedance component and a controller. The charging/discharging circuit is connected to the power source. An input of the switching circuit is connected to the charging/discharging circuit, and an output of the switching circuit is defined as an output of the inrush current restraining circuit. One end of the first impedance component is connected to the power source. The second impedance component is connected between the other end of the first impedance and the switching circuit. The controller is connected to a joint of the first impedance component and the second impedance component, for providing a control signal.

Another exemplary embodiment of the present invention provides an audio device. The audio device includes an audio circuit, a DC-blocking capacitor, and an inrush current restraining circuit. The DC-blocking capacitor is used for blocking DC components of a signal output from the audio circuit. The inrush current restraining circuit includes a power source, a charging/discharging circuit, a switching circuit, a first impedance component, a second impedance component, and a controller. The charging/discharging circuit is connected to the power source. An input of the switching circuit is connected to the charging/discharging circuit, and an output of the switching circuit is defined as an output of the inrush current restraining circuit. One end of the first impedance component is connected to the power source. The second impedance component is connected between the other end of the first impedance and the switching circuit. The controller is connected a joint of the first impedance component and the second impedance component, for providing a control signal.

Other advantages and novel features will become more apparent from the following detailed description when taken in conjunction with the accompanying drawings, in which:

DETAILED DESCRIPTION OF THE INVENTION

Figure 1:
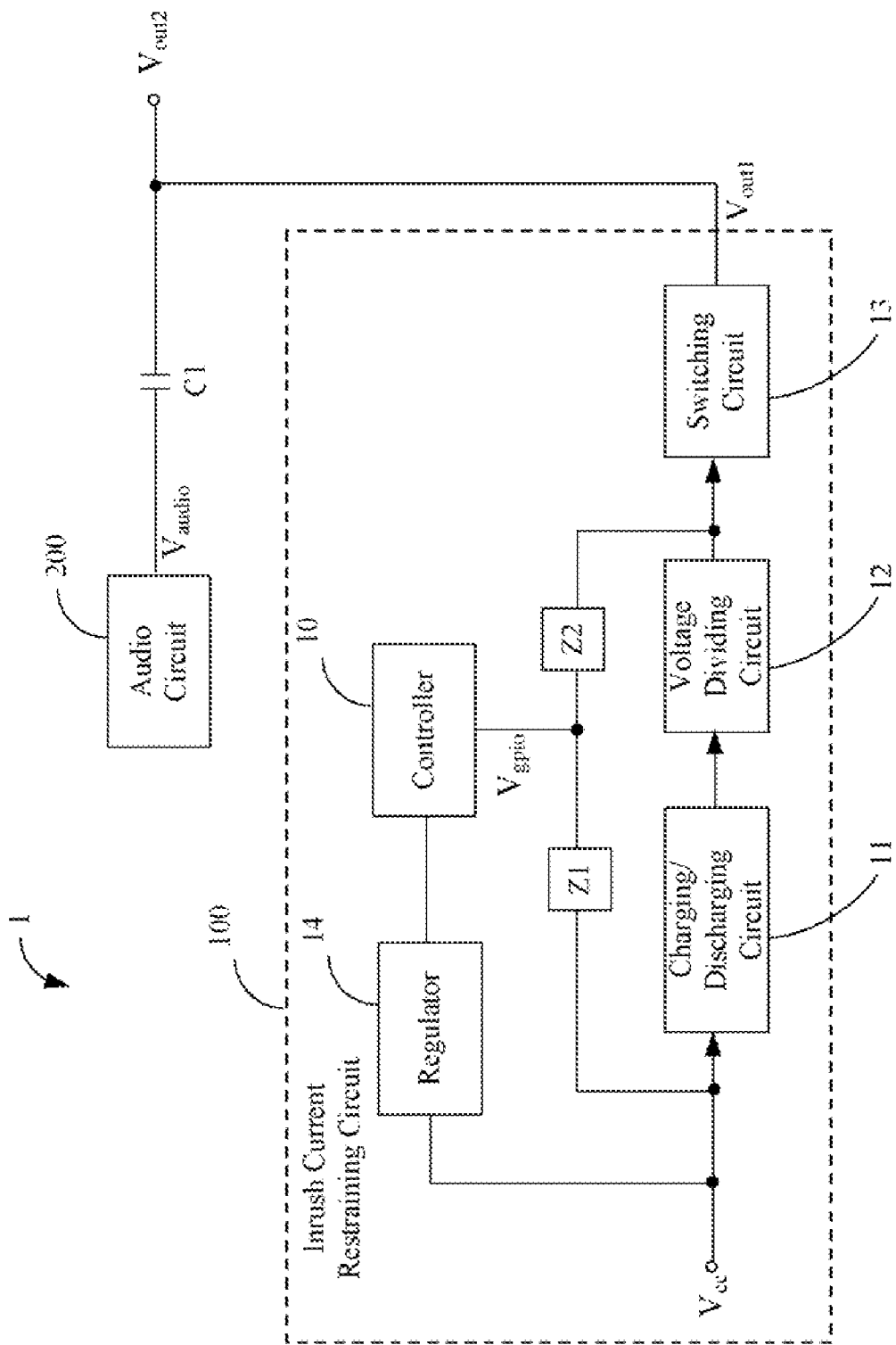
FIG. 1 is a block diagram of an audio device of an exemplary embodiment of the present invention.

FIG. 1 is a block diagram of an audio device 1 of an exemplary embodiment of the present invention. The audio device 1 includes an audio circuit 200, a DC-blocking capacitor C1, and an inrush current restraining circuit 100. The inrush current restraining circuit 100 is connected to the audio circuit 200 via the DC-blocking capacitor C1, for restraining inrush current generated by the audio device 1. The inrush current restraining circuit 100 includes a power source Vcc, a controller 10, a charging/discharging circuit 11, a voltage dividing circuit 12, a switching circuit 13, a regulator 14, a first impedance Z1 and a second impedance Z2.

The audio circuit 200 outputs an audio signal $V_{audio}$. The DC-blocking capacitor C1 is used for blocking a DC component of the audio signal $V_{audio}$ output from the audio circuit 200, and the audio signal $V_{audio}$ without the DC component is defined as output $V_{out2}$ of the audio device 1. However, inrush current is generated due to a capacitance effect when the audio device 1 is initially turned on or off. In the exemplary embodiment, the inrush current restraining circuit 100 restrains the inrush current.

In the inrush current restraining circuit 100, the charging/discharging circuit 11 is connected to the power source $V_{cc}$. Input of the switching circuit 13 is connected to the charging/discharging circuit 11 via the voltage dividing circuit 12. Output of the switching circuit 13 is defined as output $V_{out1}$ of the inrush current restraining circuit 100. In the exemplary embodiment, the voltage dividing circuit 12 is used for dividing voltage output to the switching circuit 13.

In the exemplary embodiment, one end of the first impedance Z1 is connected to the power source $V_{cc}$. The second impedance Z2 is connected between the other end of the first impedance Z1 and the switching circuit 13. That is, the second impedance Z2 is connected to the first impedance Z1 in series, and the charging/discharging circuit 11 is connected to the voltage dividing circuit 12 in series. Then, the two series circuits are connected in parallel each other. The controller 10 is connected to a joint of the first impedance Z1 and the second impedance Z2, for providing a control signal $V_{gpio}$. In the exemplary embodiment, the first impedance Z1 is used for avoiding a short circuit between the controller 10 and the power source $V_{cc}$. The second impedance Z2 is used for preventing a current output from the charging/discharging circuit 11 flowing to the controller 10 via the voltage dividing circuit 12. The regulator 14 is connected between the controller 10 and the power source $V_{cc}$, for converting a signal output from the power source $V_{cc}$ to a lower signal, such as: 3.3V, and transmits the lower signal to the controller 10 to maintain normal operation.

In the exemplary embodiment, the regulator 14 is an integrated circuit. The lowest normal working voltage of the regulator 14 is about 5V. The controller 10 is a microprocessor, which has a general purpose input/output (GPIO) pin. In addition, the power source $V_{cc}$ provides a DC voltage, such as: 12V, to the inrush current restraining circuit 100.

Figure 2:
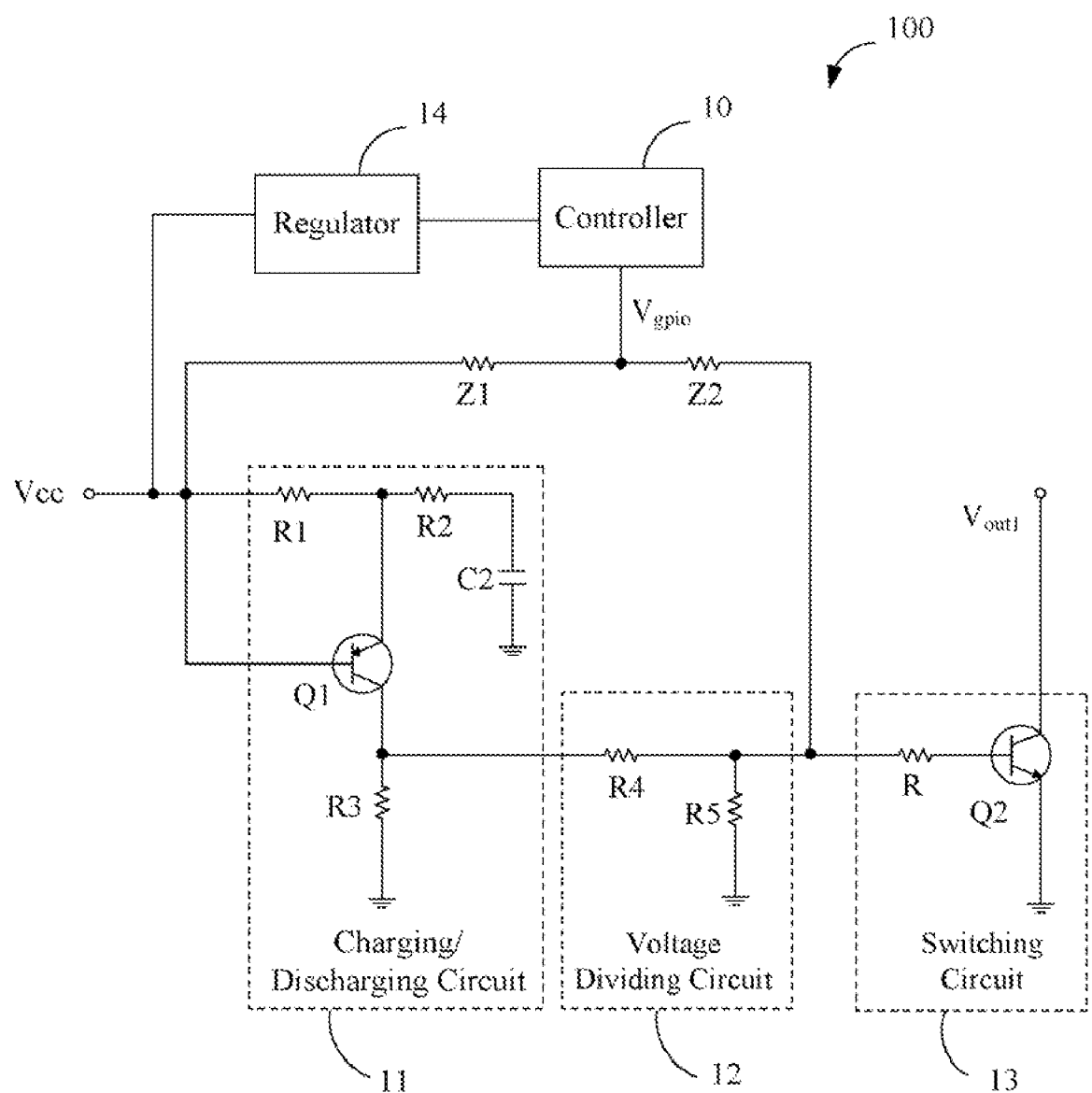
FIG. 2 is a detailed circuit diagram of an inrush current restraining circuit of FIG. 1.

FIG. 2 is a detailed circuit diagram of the inrush current restraining 100 of the present invention. The charging/discharging circuit 11 includes a capacitor C2, a PNP transistor Q1, a first resistor R1, a second resistor R2, and a third resistor R3. A base of the PNP transistor Q1 is connected to the power source Vcc, which is defined as an input of the charging/discharging circuit 11. The first resistor R1 is connected between the base and an emitter of the PNP transistor Q1, for providing a bias voltage. The capacitor C2 and the second resistor R2 is connected between the emitter of the PNP transistor Q1 and ground in series, for providing a discharging loop to the charging/discharging circuit 11. The third resistor R3 is connected between a collector of the PNP transistor Q1 and ground.

In the exemplary embodiment, when the audio device 1 is on, the PNP transistor Q1 is off, thus, the charging/discharging circuit 11 is charged by the power source $V_{cc}$. That is, the capacitor C2 is charged by the power source $V_{cc}$ via the first resistor R1 and the second resistor R2.

When the audio device 1 is off, the voltage provided by the power source $V_{cc}$ starts to drop. While a voltage-drop of the first resistor R1 is greater than a turn-on voltage of the PNP transistor Q1, such as: 0.7V, the PNP transistor Q1 is on. Therefore, the capacitor C2 starts to discharge via the second resistor R2, and some of a discharging current is output to the switching circuit 13 via the voltage dividing circuit 12.

The voltage dividing circuit 12 is connected between the output of the charging/discharging circuit 12 and input of the switching circuit 13, for dividing voltage output to the switching circuit 13. The voltage dividing circuit 12 includes a fourth resistor R4 and a fifth resistor R5. The fourth resistor R4 is connected between the charging/discharging circuit 11 and the input of the switching circuit 13, and the fifth resistor R5 is connected between the input of the switching circuit 13 and ground. Therefore, when the audio device 1 is off, the voltage dividing circuit 12 divides the voltage output from the charging/discharging circuit 11, to keep the voltage output to the switching circuit 13 from being too high.

The switching circuit 13 includes a switching component Q2 and a bias resistor R. The switching component Q2 has an input, a first output, and a second output. The input of the switching component Q2 is defined as the input of the switching circuit 13, and the second output of the switching component Q2 is grounded. In the exemplary embodiment, the switching component Q2 is an NPN transistor. In addition, the input of the switching component Q2 is a base of the NPN transistor; the first output of the switching component Q2 is a collector of the NPN transistor; and the second output of the switching component Q2 is an emitter of the NPN transistor. One end of the bias resistor R is connected to the base of the NPN transistor. The other end of the bias resistor R is defined as the output of the switching circuit 13, which is connected to the fourth resistor R4, for providing a bias voltage for the NPN transistor.

When the NPN transistor is on, the inrush current of the audio device 1 is guided to ground via the DC-blocking capacitor C1 and the NPN transistor. Therefore, no popping noise is generated by the output of the audio device 1. When the NPN transistor is off, the audio signal $V_{audio}$ generated by the audio device 1 is transmitted to the earphone or the loudspeaker via the DC-blocking capacitor C1.

In the exemplary embodiment, when the audio device 1 is on, the controller 10 is an initial status, that is, an input status, the controller 10 starts to download codes from a flash memory. On the one hand, the charging/discharging circuit 11 is charged by the power source $V_{cc}$; on the other hand, the switching circuit 13 is on, that is, the NPN transistor is on. Therefore, the inrush current generated when the audio device is on can be guided to ground via the NPN transistor to avoiding the popping noise. In the exemplary embodiment, the first impedance component Z1 and the second impedance component Z2 are resistors.

When the codes are finished downloading, the controller 10 is in an output mode, which outputs the control signal $V_{gpio}$. In the exemplary embodiment, the output mode is a logic low level, such as: 0. Therefore, the power source $V_{cc}$ is provided to the controller 10 via the first impedance component Z1. Therefore, the NPN transistor is off, and the audio signal $V_{audio}$ is output to the earphone or loudspeaker.

When the audio device 1 is switched off, the power source $V_{cc}$ drops from 12V to 5V. The controller 10 is in the output mode, that is, the control signal $V_{gpio}$ is also the logic low level. Then, the power source $V_{cc}$ is provided to the controller 1o via the first impedance component Z1. However, the PNP transistor Q1 is on due to discharging by the capacitor C2 of the charging/discharging circuit 11. Thus, the NPN transistor of the switching circuit 13 is also on. Consequently, the inrush current generated when the audio device 1 is switched off is guided to ground. In the exemplary embodiment, discharge time of the capacitor C2 is greater than a fall time of the voltage from 12V to 5V.

When the power source $V_{cc}$ is dropped below 5V, a sensor (not shown) on a circuit board senses that the voltage is lower than a predetermined value, and then transmits a reset signal to the controller 10. Correspondingly, status of the controller 10 is converted from the input mode to the output mode, which is performed by a software in the controller 10. When the power source $V_{CC}$ is drops from 5V to 0V, the NPN transistor is also on via the power source $V_{cc}$ added to the first impedance component Z1 and the second impedance component Z2. In other words, even if the capacitor C2 is fully discharged, the inrush current of the audio device 1 is flowing to the ground. Therefore, the inrush current generated when the audio device 1 is switched off is all guided to ground.

Figure 3:
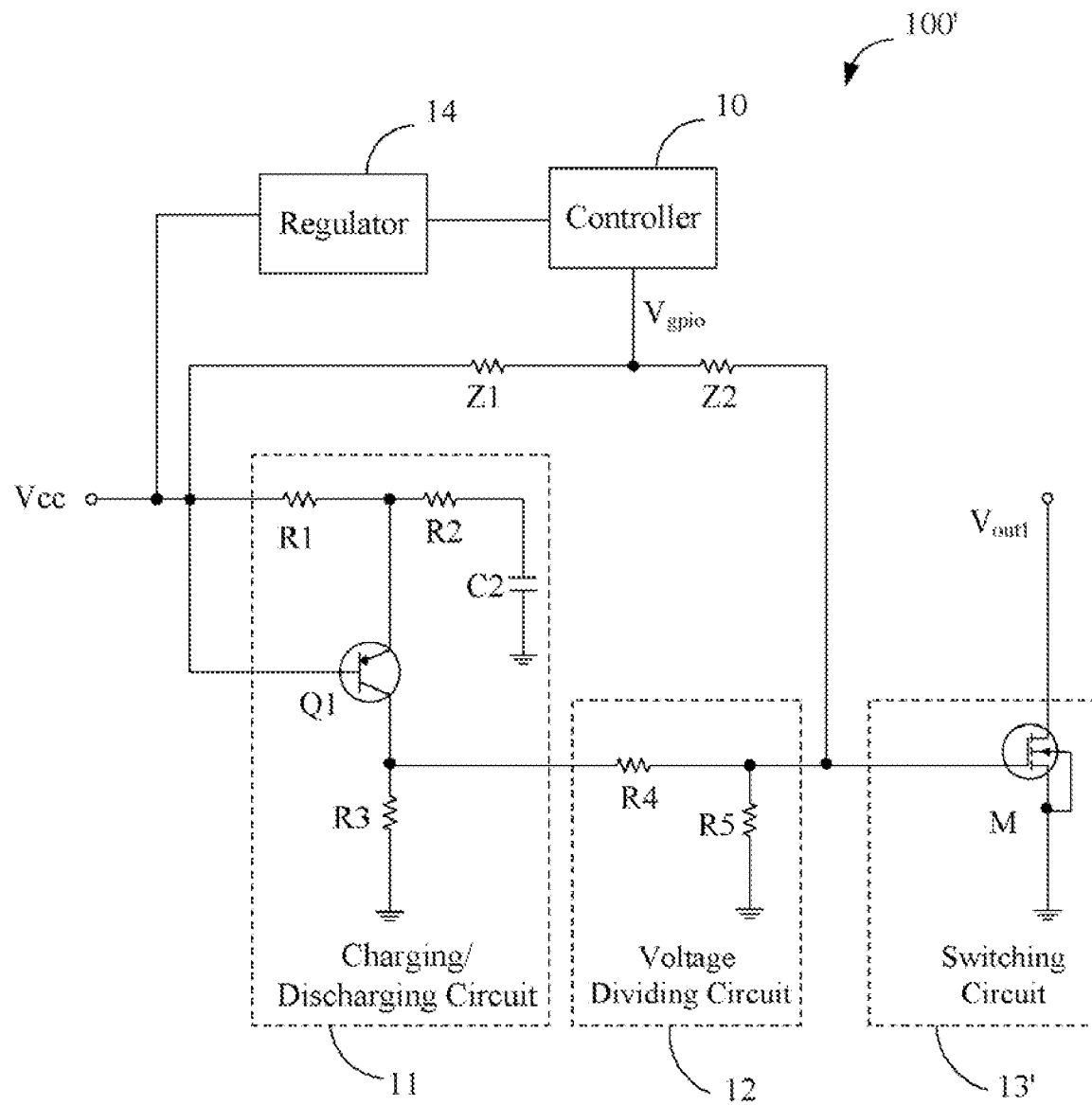
FIG. 3 is a detailed circuit diagram of an inrush current restraining circuit of another exemplary embodiment of the present invention.

FIG. 3 is a detailed circuit diagram of an inrush current restraining circuit 100' of another embodiment of the present invention. The inrush current restraining circuit 100' is substantially the same as that of FIG. 2, except that a switching circuit 13' includes an N type Metal-Oxide-Semiconductor Field Effect Transistor (MOSFET) M. A gate of the MOSFET M is defined as an input of the switching circuit 13', a drain of the MOSFET M is defined as an output of the switching circuit 13', and a source of the MOSFET is grounded. Similarly, the inrush current restraining circuit 100' controls the switching circuit 13' being on/off via the MOSFET M.

In the inrush current restraining circuit 100 of the present invention, when the audio device 1 is on, the inrush current is grounded via the switching circuit 13; when the audio device 1 is switched off, the inrush current is grounded via the control signal Vgpio, charging/discharging circuit 11, and the switching circuit 13.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalent.

What is claimed is:

1. An inrush current restraining circuit, comprising:
  a power source;
  a charging/discharging circuit connected to the power source, comprising:
    a PNP transistor; wherein a base of the PNP transistor is connected to the power source, and a collector of the PNP transistor is connected to the input of the switching circuit;
    a first resistor connected between the base and an emitter of the PNP transistor, for providing a bias voltage;
    a second resistor;
    a capacitor connected to the second resistor in series; and
    a third resistor connected between the collector of the PNP transistor and ground, wherein the second resistor and the capacitor are connected between the emitter of the PNP transistor and ground;
a switching circuit, wherein an input of the switching circuit is connected to the charging/discharging circuit, and an output of the switching circuit is defined as an output of the inrush current restraining circuit;
a first impedance component, wherein one end of the first impedance component is connected to the power source;
a second impedance component connected between the other end of the first impedance and the switching circuit; and
a controller connected to a joint of the first impedance component and the second impedance component, for providing a control signal.

2. The inrush current restraining circuit as claimed in claim 1, wherein the switching circuit comprises a switching component having an input, a first output, and a second output; wherein the first output is defined as the output of the switching circuit, and the second output is ground.

3. The inrush current restraining circuit as claimed in claim 2, wherein the switching circuit comprises a Metal-Oxide-Semiconductor Field Effect Transistor (MOSFET), wherein a gate of the MOSFET is defined as the input of the switching circuit; a drain of the MOSFET is defined as the first output of the switching circuit, and a source of the MOSFET is defined as the second output of the switching circuit.

4. The inrush current restraining circuit as claimed in claim 2, wherein the switching circuit comprises a bias resistor for providing a bias voltage of the switching component; wherein one end of the bias resistor is connected to the output of the switching circuit, and the other end of the resistor is defined as the input of the switching circuit.

5. The inrush current restraining circuit as claimed in claim 4, wherein the switching component is NPN transistor, wherein a base of the NPN transistor is the input of the switching component; a collector of the NPN transistor is the first output of the switching component, and an emitter of the NPN transistor is the second output of the switching component.

6. The inrush current restraining circuit as claimed in claim 1, farther comprising a voltage dividing circuit connected between the charging/discharging circuit and the switching circuit, for dividing voltage provided to the switching circuit.

7. The inrush current restraining circuit as claimed in claim 6, wherein the voltage dividing circuit comprises:
a fourth resistor connected between the charging/discharging circuit and the input of the switching circuit; and
a fifth resistor connected between the input of the switching circuit and ground.

8. The inrush current restraining circuit as claimed in claim 1, further comprising a regulator connected between the power source and the controller, for converting a signal output from the power source to a lower signal and outputting the lower signal to the controller.

9. An audio device comprising: an audio circuit;
a DC-blocking capacitor for blocking DC components of a signal output from the audio circuit; and
an inrush current restraining circuit connected to the audio circuit via the DC-blocking capacitor, for restraining inrush current generated by the audio device, the inrush current restraining circuit comprising:
a power source;
a charging/discharging circuit connected to the power source;
a switching circuit, wherein an input of the switching circuit is connected to the charging/discharging circuit, and an output of the switching circuit is defined as an output of the inrush current restraining circuit;
a first impedance component, wherein one end of the first impedance component is connected to the power source;
a second impedance component connected between the other end of the first impedance and the switching circuit; and
a controller connected to a joint of the first impedance component and the second impedance component, for providing a control signal.

10. The audio device as claimed in claim 9, wherein the charging/discharging circuit comprises:
a PNP transistor; wherein a base of the PNP transistor is connected to the power source, and a collector of the PNP transistor is connected to the input of the switching circuit;
a first resistor connected between the base and an emitter of the PNP transistor, for providing a bias voltage;
a second resistor;
a capacitor connected to the second resistor in series; and
a third resistor connected between the collector of the PNP transistor and ground;
wherein the second resistor and the capacitor are connected between the emitter of the PNP transistor and ground.

11. The audio device as claimed in claim 9, wherein the switching circuit comprises a switching component having an input, a first output, and a second output; wherein the first output is defined as the output of the switching circuit, and the second output is ground.

12. The audio device as claimed in claim 11, wherein the switching circuit comprises a Metal-Oxide-Semiconductor Field Effect Transistor (MOSFET), wherein a gate of the MOSFET is defined as the input of the switching circuit; a drain of the MOSFET is defined as the first output of the switching circuit, and a source of the MOSFET is defined as the second output of the switching circuit.

13. The audio device as claimed in claim 11, wherein the switching circuit comprises a bias resistor for providing a bias voltage of the switching component; wherein one end of the bias resistor is connected to the output of the switching circuit, and the other end of the resistor is defined as the input of the switching circuit.

14. The audio device as claimed in claim 13, wherein the switching component is an NPN transistor, wherein a base of the NPN transistor is the input of the switching component; a collector of the NPN transistor is the first output of the switching component, and an emitter of the NPN transistor is the second output of the switching component.

15. The audio device as claimed in claim 9, further comprising a voltage dividing circuit connected between the charging/discharging circuit and the switching circuit, for dividing voltage provided to the switching circuit.

16. The audio device as claimed in claim 15, wherein the voltage dividing circuit comprises:
a fourth resistor connected between the charging/discharging circuit and the input of the switching circuit; and
a fifth resistor connected between the input of the switching circuit and ground.

17. The audio device as claimed in claim 9, further comprising a regulator connected between the power source and the controller, for converting a signal output from the power source to a lower signal and outputting the lower signal to the controller.

* * * * *